H. VON BAEYER.
DISPENSING VESSEL.
APPLICATION FILED DEC. 30, 1907.
900,644.
Patented Oct. 6, 1908.
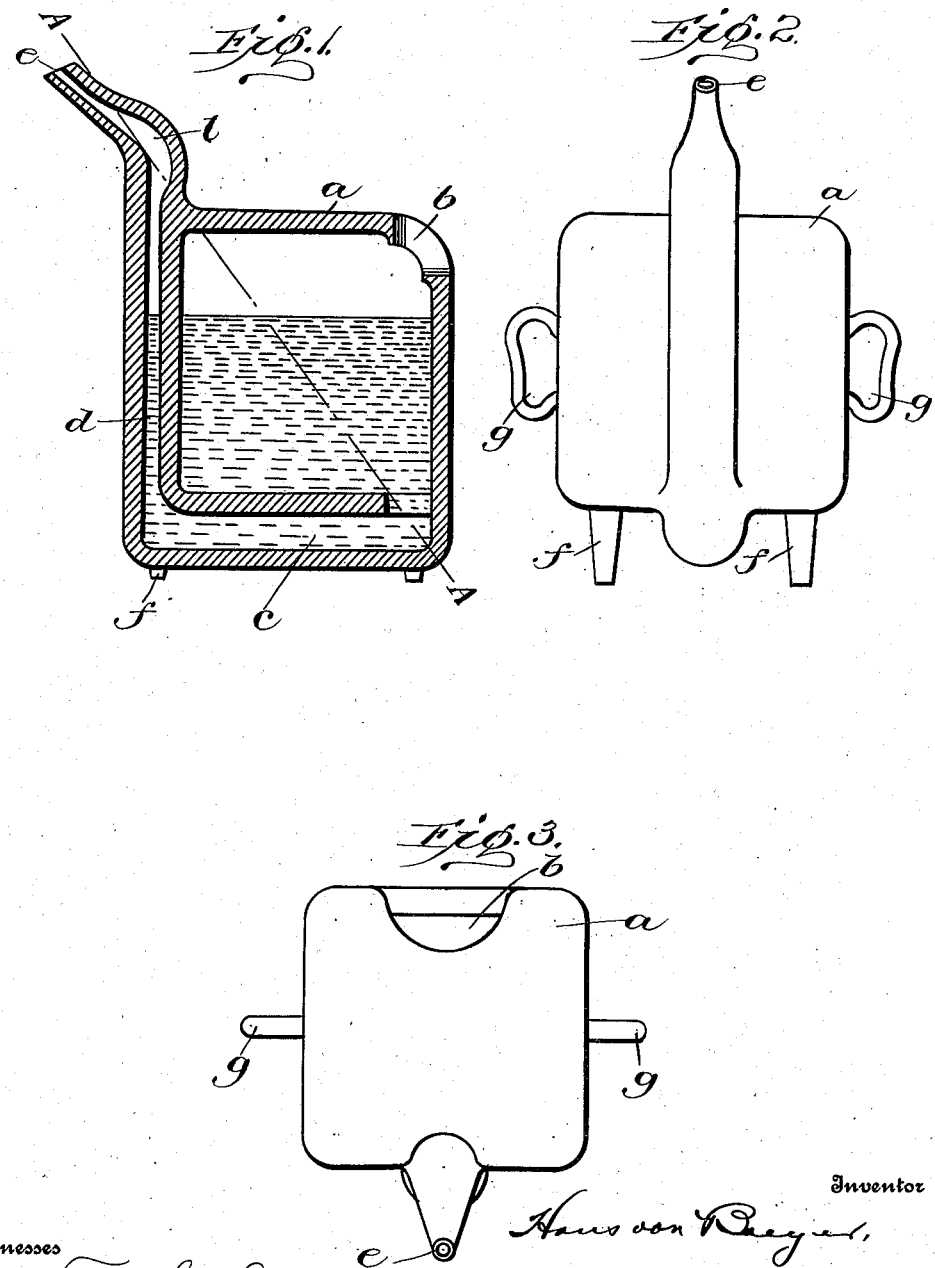

UNITED STATES PATENT OFFICE.

HANS VON BAEYER, OF MUNICH, GERMANY.

DISPENSING VESSEL.

No. 900,644.   Specification of Letters Patent.   Patented Oct. 6, 1908.

Application filed December 30, 1907. Serial No. 408,622.

*To all whom it may concern:*

Be it known that I, HANS VON BAEYER, a citizen of Germany, residing at Munich, Bavaria, Germany, have invented certain new and useful Improvements in Dispensing Vessels; and I do hereby declare the following to be a full, clear and exact description of the invention, such as will enable others skilled in the art to which it appertains to make and use the same.

Vessels in the form of bottles with devices for dispensing substantially equal quantities of liquid, more especially for medicine or the like, and having a hollow space in the bottom or lower part and an outlet channel or passage leading upwards, are already known. Such dispensing bottles had hitherto the disadvantage that the channel was difficult to clean on account of its being situated inside the bottle and especially because of its comparatively great length, a disadvantage that might lead to serious consequences in the case of vessels used chiefly by sick persons. A further objection to bottles of this kind was the fact that when the liquid flowed back in the channel after use, drops were formed, which remained in the tube and, when the vessel was again used, were pushed forward by the oncoming liquid and often spurted into the patient's face. In order to remedy these disadvantages the present invention is made in the form of a cup, the outlet channel being arranged on the outside of the vessel and leading upwards on the side opposite to the inlet or opening for filling the vessel; this outlet channel has further at or near its upper end an enlarged space to prevent the formation of drops.

Referring to the accompanying drawing, the vessel according to the present invention is shown in Figure 1 in section, in Fig. 2 in a front view and in Fig. 3 in a plan view.

The vessel —a— contains at the top an inlet —b— and at the bottom, on the same side as —b—, an outlet leading into the channel —c— under the bottom of the vessel. This channel —c— has its continuation in the narrower channel or pipe —d— leading upwards parallel to the walls or sides of the vessel and arranged on the side opposite to the inlet —b—; this latter channel is enlarged at —l— near its outer end and terminates in the mouth-piece or spout —e—.

Feet —f— are provided for the vessel to stand upon when not in use and two handles —g— serve to conveniently hold the vessel during use.

The vessel may advantageously be constructed of porcelain or china. The channels are everywhere rounded off to facilitate cleansing.

For use, the vessel is first filled and the liquid slowly and without interruption poured out of the spout —e— until no further liquid flows. A quantity of liquid will now remain in the vessel corresponding to the space bounded by the line A—A in Fig. 1, this line corresponding to the level of the liquid when the vessel has been tilted and the superfluous liquid has run off, as explained above. If the vessel is now brought back into the upright position a certain quantity of liquid will again enter the channels —c— and —d—. And now, each time the vessel is tilted, a nearly equal quantity of liquid will issue from the spout —e—, this quantity being very slightly reduced after each successive dispensing of liquid, the reduction being caused by and corresponding with the lowering of the level in the channel —d—. In order to make this reduction so small that it may be practically neglected, or, in other words, to secure practically equal quantities being dispensed each time the vessel is used, said outlet channel —d— is made of very small interior diameter.

This vessel has the following advantages: It is practically impossible for the patient to spill the medicine when taking the same; the patient always receives a certain measured quantity or he cannot exceed a certain quantity; and further, the narrow outlet and consequent slow outflow of liquid will prevent the patient from taking too large gulps, as is often the case with invalids. The enlargement of the outlet channel at —l— prevents the projection into the face of the patient of drops which may be formed in the outlet channel when the vessel is, after use, again erected. The edges of the inlet —b— project inwardly, as shown in Fig. 1, in order to prevent, as much as possible, any spilling or spurting of the liquid.

What I claim as my invention and desire to secure by Letters Patent, is:

1. In a dispensing vessel, a cup divided by a horizontal partition into an upper storage chamber and a lower measuring chamber, the upper chamber having an unobstructed inlet at one side and near the top and the two chambers intercommunicating at the same side as the inlet, and an outlet pipe extending from the lower chamber vertically on the outside of the cup to a point higher than the cup interior and on the side opposite the inlet and communicating opening.

2. In a dispensing vessel, a cup divided by a horizontal partition into an upper storage chamber and a lower measuring chamber, the upper chamber having an inlet at one side and near the top and the two chambers intercommunicating at the same side as the inlet, and an outlet pipe extending from the lower chamber vertically on the outside of the cup to a point higher than the cup interior and on the side opposite the inlet and communicating opening and then bent away from the cup, that portion of the outlet pipe corresponding in elevation to the cup interior being of restricted cross-sectional area with an internal enlargement at the bend.

3. In a dispensing vessel, a cup divided by a horizontal partition into an upper storage chamber and a lower measuring chamber, the upper chamber having an inlet at one side and near the top and the two chambers intercommunicating at the same side as the inlet, and an outlet pipe extending from the lower chamber vertically on the outside of the cup to a point higher than the cup interior and on the side opposite the inlet and communicating opening, that portion of the outlet pipe corresponding in elevation to the cup interior being of restricted cross-sectional area, and said outlet pipe having an internal enlargement near its outer extremity above the level of the cup interior.

In testimony whereof I hereunto affix my signature in the presence of two witnesses.

HANS VON BAEYER.

Witnesses:
   HILDEGARD VON BAEYER,
   FRITZ MITTELBERGER.